(12) United States Patent
Yeh

(10) Patent No.: US 8,278,572 B2
(45) Date of Patent: Oct. 2, 2012

(54) ELECTROMAGNETIC INDUCTION HANDWRITING SYSTEM AND COORDINATE DETERMINING METHOD THEREOF

(75) Inventor: Chia-Jui Yeh, Taipei (TW)

(73) Assignee: Waltop International Corporation, Hsinchu (TW)

( * ) Notice: Subject to any disclaimer, the term of this patent is extended or adjusted under 35 U.S.C. 154(b) by 460 days.

(21) Appl. No.: 12/422,201

(22) Filed: Apr. 10, 2009

(65) Prior Publication Data

US 2010/0206644 A1   Aug. 19, 2010

(30) Foreign Application Priority Data

Feb. 13, 2009   (CN) .......................... 2009 1 0009116

(51) Int. Cl.
*G06F 3/046*   (2006.01)
(52) U.S. Cl. ..................................... 178/18.07; 345/174
(58) Field of Classification Search .................. 345/443, 345/173, 174; 343/867; 178/18.01, 18.07, 178/19.07
See application file for complete search history.

(56) References Cited

U.S. PATENT DOCUMENTS

| | | | | |
|---|---|---|---|---|
| 5,134,689 A * | 7/1992 | Murakami et al. | ............ | 345/443 |
| 5,369,227 A * | 11/1994 | Stone | .......................... | 178/19.07 |
| 5,691,513 A * | 11/1997 | Yamamoto et al. | ........ | 178/18.07 |
| 7,675,507 B2 * | 3/2010 | Oda et al. | ....................... | 345/173 |
| 2003/0206142 A1* | 11/2003 | Yeh | ................ | 343/867 |
| 2003/0217871 A1* | 11/2003 | Chao et al. | ................. | 178/18.01 |

* cited by examiner

*Primary Examiner* — Chanh Nguyen
*Assistant Examiner* — James Nokham
(74) *Attorney, Agent, or Firm* — Huffman Law Group, P.C.

(57) ABSTRACT

The present invention discloses an electromagnetic induction handwriting system and its single side coordinate determining method for determining a coordinate of a stylus on a handwriting apparatus. The coordinate is computed by a first voltage, a second voltage, and a third voltage, where the first voltage equals the maximum detection voltage, the second voltage and the third voltage are obtained from two antennas, and both of the two antennas are arranged at the same side of the antenna that induces the maximum detection voltage.

10 Claims, 4 Drawing Sheets

ELECTROMAGNETIC INDUCTION HANDWRITING SYSTEM AND COORDINATE DETERMINING METHOD THEREOF

BACKGROUND OF THE INVENTION

1. Field of the Invention

The present invention relates to a handwriting system, and more particularly, to a handwriting system having single side coordinate determining method.

2. Description of the Prior Art

A handwriting system, for example, a tablet, a digitizer, a white board, and so forth, includes two major kinds of inputting method: electromagnetic induction type and touch panel type.

For example, a tablet comprises an inputting surface and an independent stylus. When the stylus presses or approaches the inputting surface, electrical field is caused by electromagnetic induction, and the coordinate of the stylus is detected. For sensing the electric field, the tablet may comprise an x-y loop antenna array, multiplexers, band pass filter, rectifier, integrator, peak detector, A/D converter, frequency counter, and microprocessor.

Many apparatus and their coordinate detecting methods for detecting the coordinate of the stylus are disclosed. A United States issued patent, U.S. Pat. No. 4,477,877, entitled "Coordinate determining device," the inventor Nakamura et al. disclose a coordinate determining device and method. A scanning signal is applied in sequence to the sensing line $X_1$, $X_2$, $X_3$ . . . of X-axis sensing lines, and detection voltages $V_1$, $V_2$, $V_3$ . . . of the sensing line $X_1$, $X_2$, $X_3$ . . . are fed to an A/D converter to be converted to digital signals and then stored. If sensing line $X_p$ is the nearest sensing line to the stylus, then $X_p$ generates the maximum detection voltage $V_{px}$. All detection voltages $V_1$, $V_2$, $V_3$ . . . are compared for getting the detection voltage $V_{px}$, $V_{p-1x}$, and $V_{p+1x}$, where $V_{p-1x}$ is a detection voltage from sensing line $X_{p-1}$ that is one address before the sensing line $X_p$, and $V_{p+1x}$ is a detection voltage from sensing line $X_{p+1}$ that is one address after the sensing line $X_p$.

The coordinate of the stylus is first computed from a Q value:

If $V_{p-1x} \geq V_{p+1x}$, then $$Q = \frac{V_{px} - V_{p+1x}}{V_{px} - V_{p-1}};$$

and if $V_{p-1x} < V_{p+1x}$, then $$Q = \frac{V_{px} - V_{p-1x}}{V_{px} - V_{p+1x}}.$$

In addition, to eliminate and compensate for the error of computation caused by an inclination of the stylus, a parameter $f(\theta)$ is computed by the following equation, where $\theta$ is inclined angle relative to the X-axis, and the sign of $V_{+PX}$ and $V_{-PX}$ are secondary peaks at both sides of $V_{px}$ discriminated to detect the inclination direction of the stylus:

$$f(\theta) = \left| \frac{V_{+px} - V_{-Px}}{V_{+px} + V_{-px}} \right|$$

where the value of error of the computed position corresponding to $f(\theta)$ is entirely memorized in a ROM of a memory circuit of the system. The accurate coordinate value is computed by adding or subtracting the value of error found by $f(\theta)$. In other words, the amount of compensation is obtained from a look up table stored in the memory circuit. However, the value of error of the computed position corresponding to $f(\theta)$ are obtained from experiential value; this will waste time and cost. In addition, the curve of the detection voltage is best fitted by a quadratic equation in two variables. Nakamura et al. determines the coordinate by a linear equation in two variables that will inevitably result in inaccuracy.

Another United States issued patent, U.S. Pat. No. 4,848,496, entitled "Coordinates input apparatus," the inventor Murakami et al. disclose a coordinate determining method that the coordinate of the stylus xp is computed by:

$$xp = x2 + \Delta x/2(3V_{x2} - 4V_{x3} + 4V_{x4})(V_{x2} - 2V_{x3} + V_{x4})$$

where $V_{x3}$ denotes the maximum value of the detection voltages from a loop coil x3, $V_{x2}$ denotes a detection voltage from sensing line x2 that before the loop coil $X_3$, $V_{x4}$ denotes a detection voltage from loop coil x4 that after the loop coil $X_3$, and $\Delta x$ denotes the pitch between two loop coils.

Murakami et al. employ a quadratic equation to approximate maximum detection voltage $V_{x3}$. As Nakamura's invention, $V_{x2}$ and $V_{x4}$ are respectively obtained from left and right sides of the loop coil x3. When the stylus is located on the edge of the inputting surface, the coordinate of the stylus cannot be computed accurately because the sensing line (loop coil) on the edge will sense the maximum detection voltage, and the sensing line on the edge lacks a sensing line at its left or right side.

Therefore, it would be advantageous to provide an electromagnetic induction handwriting system and its coordinate determining method that can overcome the defects of the prior art.

SUMMARY OF THE INVENTION

The object of the present invention is to provide an electromagnetic induction handwriting system and its coordinate determining method that can overcome the defects of the prior art.

According to the object, the present invention provides an electromagnetic induction handwriting system that comprises a stylus, a handwriting device, an x-y loop antenna array arranged inside of the handwriting device, a switch circuit, a coordinate computation circuit, an analog/digital (A/D) converter, a microprocessor, and a computer, wherein the microprocessor instructs specific antennas of the x-y loop antenna array by switching the switch circuit to detect electromagnetic wave radiated from the stylus, the detection voltages from the antennas comprising a first voltage, a second voltage, and a third voltage are transmitted to the coordinate computation circuit to compute a coordinate of the stylus, the computed coordinate is transmitted to analog/digital (A/D) converter to convert to digital values, and the microprocessor processes the digital coordinate values then transmitting it to the computer; and wherein the first voltage equals the maximum detection voltage, the second voltage and the third voltage are obtained from two antennas, and both of the two antennas are arranged at the same side of the antenna that induces the maximum detection voltage.

According to the object, the present invention provides a coordinate determining method for determining a coordinate of a stylus on a handwriting device. The comprises: providing a x-y loop antenna array; proceeding with a sequence of comparison procedure to compare the detection voltages of the x-y loop antenna array with a noise-judge value, such that a first voltage, a second voltage, and a third voltage are obtained, wherein the first voltage equals the maximum detection voltage, the second voltage and the third voltage are obtained from two antennas, and both of the two antennas are arranged at the same side of the antenna that induces the maximum detection voltage; and computing the coordinate of the stylus according to the first voltage, the second voltage, and the third voltage.

DESCRIPTION OF THE PREFERRED EMBODIMENT

The detailed description of the present invention will be discussed in the following embodiments, which are not intended to limit the scope of the present invention, but can be adapted for other applications. While drawings are illustrated in details, it is appreciated that the quantity of the disclosed components may be greater or less than that disclosed, except expressly restricting the amount of the components. Wherever possible, the same or similar reference numbers are used in drawings and the description to refer to the same or like parts.

Figure 1:
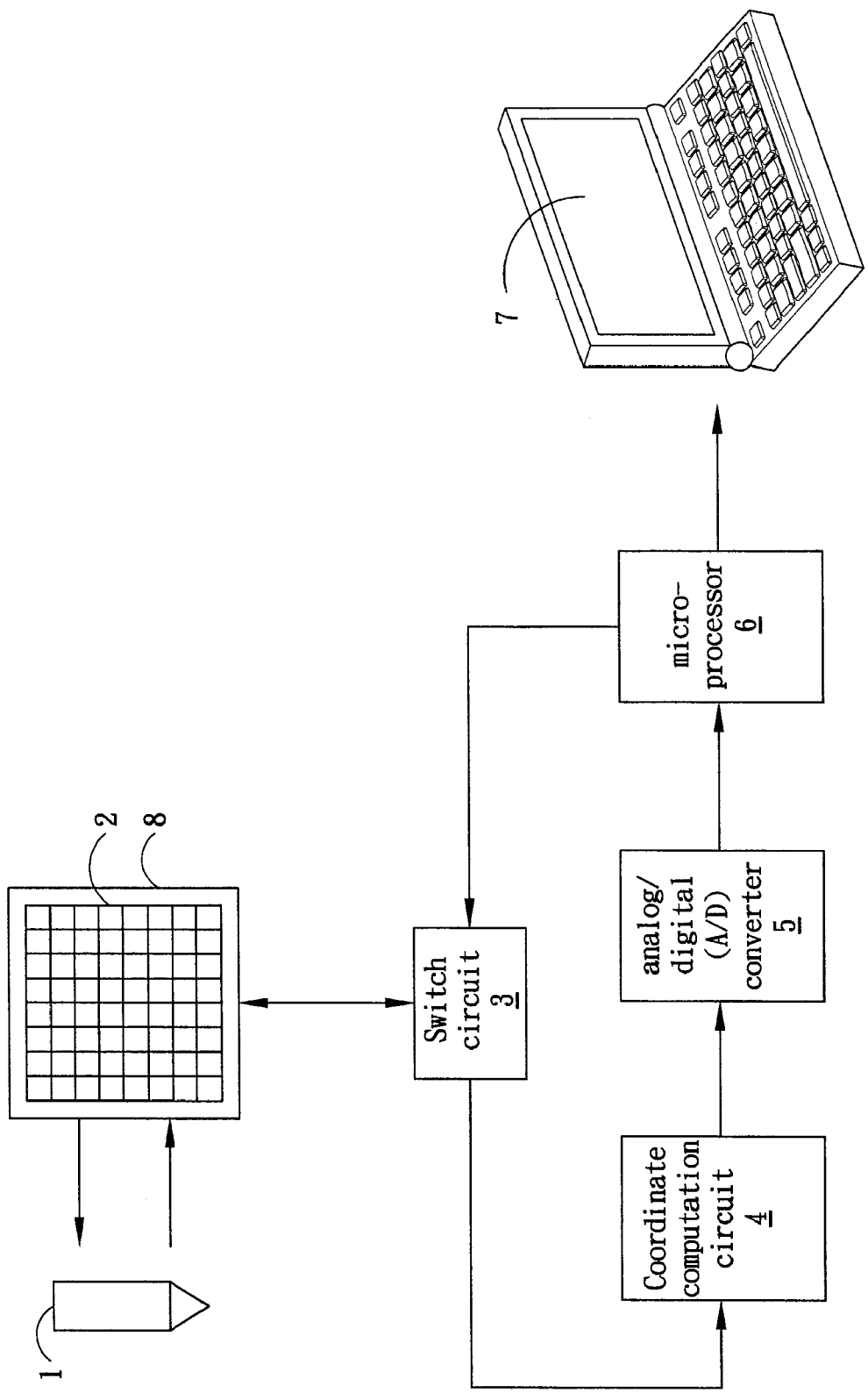
FIG. 1 illustrates an electromagnetic induction handwriting system according to one embodiment of the invention.

FIG. 1 shows an electromagnetic induction handwriting system according to one embodiment of the present invention. The electromagnetic induction handwriting system comprises a stylus 1, an x-y loop antenna array 2 arranged inside of a handwriting device 8, a switch circuit 3, a coordinate computation circuit 4, an analog/digital (A/D) converter 5, a microprocessor 6, and a computer 7. By switching the switch circuit 3, the microprocessor 6 instructs specific antennas of the x-y loop antenna array to detect electromagnetic wave radiated from the stylus 1. The detection voltages from the antennas are transmitted to the coordinate computation circuit 4 to compute the coordinate of the stylus 1. The computed coordinates are then transmitted to A/D converter 5 to convert to digital values. The microprocessor 6 processes the digital coordinate values then transmitting it to the computer 7. The electromagnetic induction handwriting system may comprise other elements, and the elements mentioned above may comprise sub-elements such as filters, amplifiers, rectifiers, and so forth.

The stylus 1 may be a cordless type or a battery less type. According to one embodiment of the present invention, the stylus 1 comprises an oscillating circuit consisting of LC (inductors and capacitors). When the stylus 1 touches an inputting surface (not shown) of the handwriting device 8, the inductance of LC will be changed and the frequency of the oscillating circuit is varied accordingly. The greater is the pressure of the stylus exerted to the inputting surface, the greater is the inductance of LC. The greater is the inductance of LC, the greater is variance of the frequency of the oscillating circuit. Therefore, the variation of the pressure exerted to the inputting surface can be estimated by checking the variation of the frequency of the oscillating circuit. In addition, the stylus 1 may comprises some push buttons or switches arranged on the sidewall of the stylus 1. The push buttons are pressed down then recovered, such that vary the capacitance of LC, and thus vary the frequency of the oscillating circuit. Checking the variation of frequency of the oscillating circuit can recognize the push button that the user pressed.

Figure 2:
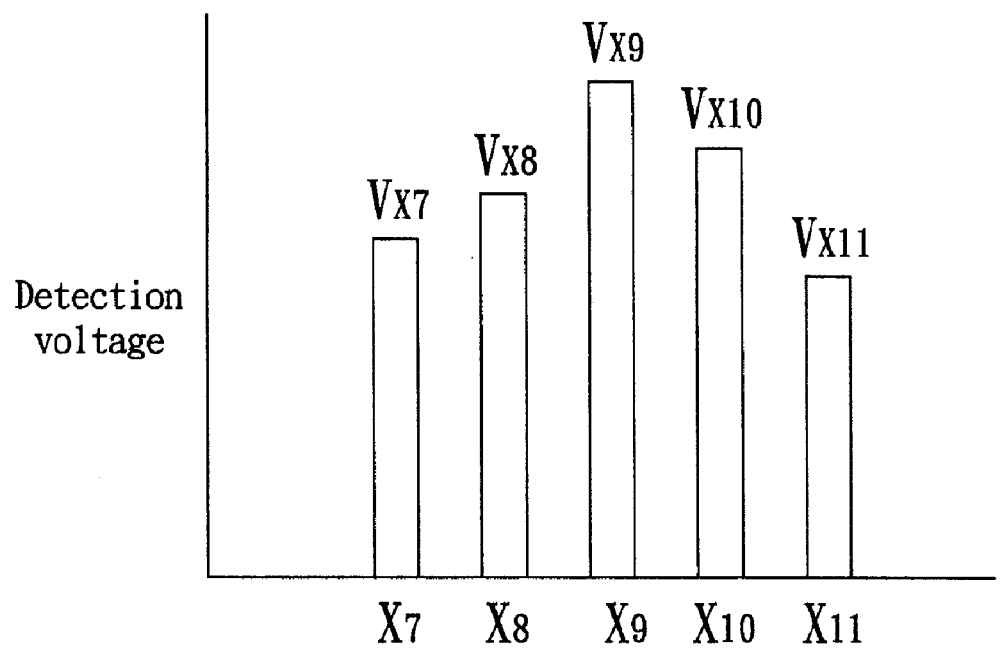
FIGS. 2-6 show a coordinate determining method according to one embodiment of the invention.

The x-y loop antenna array 2 may be arranged inside the handwriting device 2 in a double-faced, arrayed, and equidistant manner. The x-y loop antenna array 11 senses electromagnetic wave radiated from the stylus 1. Microprocessor 6 instructs specific antennas of the x-y loop antenna array 2 to detect electromagnetic wave radiated from the stylus 1; the nearest antenna will sense the maximum voltage. Microprocessor 6 comprises a plurality of registers for storing a first voltage, a second voltage, and a third voltage, where the first voltage equals the maximum detection voltage, the second voltage and the third voltage are obtained from two antennas, and both of the two antennas are arranged at the same side of the antenna that induces the maximum detection voltage. For example, FIG. 2 illustrates five antennas $X_7$-$X_{11}$ respectively sense detection voltages $V_{X7}$-$V_{X11}$. When the stylus 1 approaches the antenna $X_9$, the rank of the detection voltage of the antennas from high to low might be $V_{X9}>V_{X10}>V_{X8}>V_{X7}>V_{X11}$, where the first voltage equals $V_{X9}$, the second voltage equals $V_{X10}$, and third voltage equals $V_{X11}$; or, the first voltage equals $V_{X9}$, the second voltage equals $V_{X8}$, and third voltage equals $V_{X7}$ in another embodiment.

Figure 3:
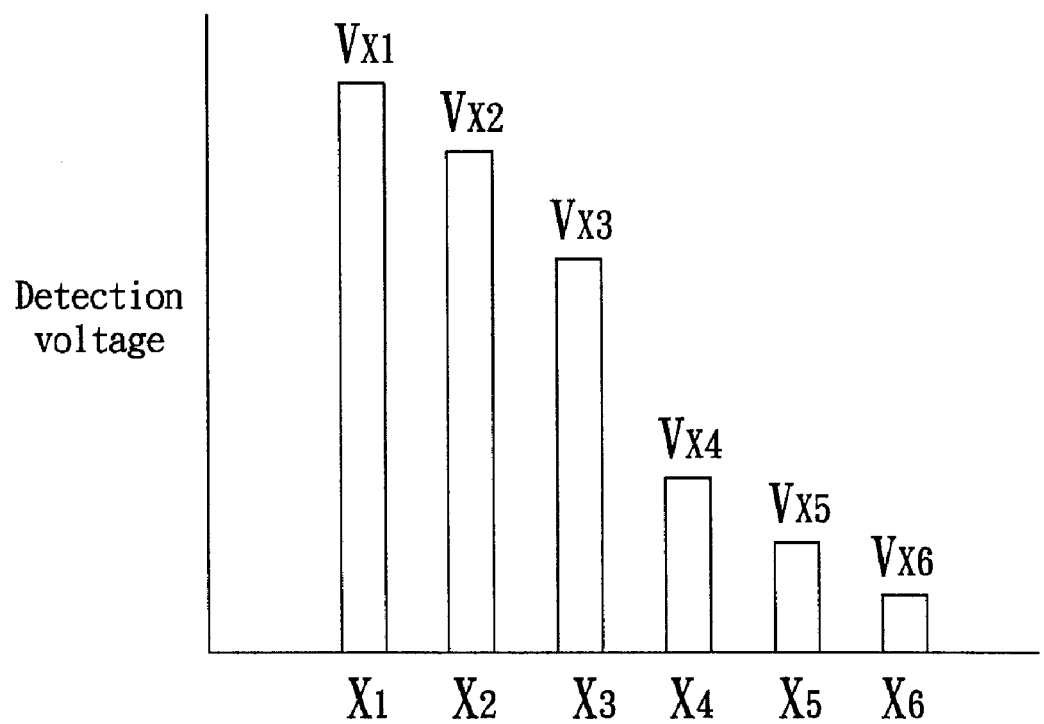

The first, second, third voltages will be employed for computing the coordinate of the stylus 1. Because the second, third voltages are obtained from two antennas arranged at the same side of the antenna that sense the maximum detection voltage, this will be suitable for computing the coordinate when the stylus 1 is located near the edge of the handwriting device 8. In addition, the first, second, third voltages are also suitable for calculating coordinate when the stylus 1 is located near the central part of the handwriting device 8. FIG. 3 illustrates an embodiment according to the present invention when the stylus 1 is located on the edge of the handwriting device. The antenna $X_1$ is the nearest antenna approached to the stylus; therefore the antenna $X_1$ will sense the maximum detection voltage $V_{X1}$. That is, the first voltage equals $V_{X1}$, the second voltage equals $V_{X2}$, and the third voltage equals $V_{X3}$. Because the distribution of the detection voltages of the antennas within a moderate distance of the X-axis is a gauss curve, the amplitudes curve near the maximum detection voltage may be fitted by a conic section, that is, a quadratic equation in two variables:

$$aX^2+bXY+cY^2+dX+eY+f=0,$$

where the layout of the x-y loop antenna is symmetrical and the pitch between two antenna is designed, such that the parameters in the above equation can satisfy: b=0, c=0, and d=0. Hence the equation is simplified to:

$$aX^2+eY+f=0$$

Figure 4:
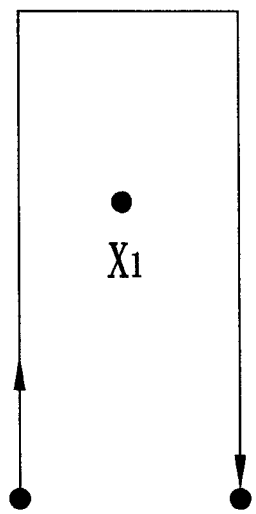

After transposition, the equation becomes:

$$Y=-\frac{a}{e}X^2-\frac{f}{e},$$

where Y denotes the amplitudes of the detection voltages. Therefore, the first voltage $V_{X1}$, the second voltage $V_{X2}$, and third voltage $V_{X3}$ can be computed by the following equations:

$$V_{X1} = -\frac{a}{e}(X_1 - X_p)^2 - \frac{f}{e} \quad (1)$$

$$V_{X2} = -\frac{a}{e}(X2 - X_p)^2 - \frac{f}{e} \quad (2)$$

$$V_{X3} = -\frac{a}{e}(X3 - X_p)^2 - \frac{f}{e} \quad (3)$$

where the $X_p$ denotes the x-coordinate of the stylus 1, $X_1$ denotes the x-coordinate of the center of the loop antenna $X_1$, as shown in FIG. 4, and $X_2$, $X_3$ have the similar definition. The equations (1), (2), (3) can be transposed to get the equation of $X_p$:

$$Xp = X_1 + \Delta x\left[\frac{4V_{X2} - 3V_{X1} - V_{X3}}{4V_{X2} - 2V_{X1} - 2V_{X3}}\right],$$

where $\Delta x$ denotes the pitch between two antennas.

The equation disclosed above is for computing x-coordinate of the stylus. The y-coordinate of the stylus can be computed by a similar equation.

Figure 5:
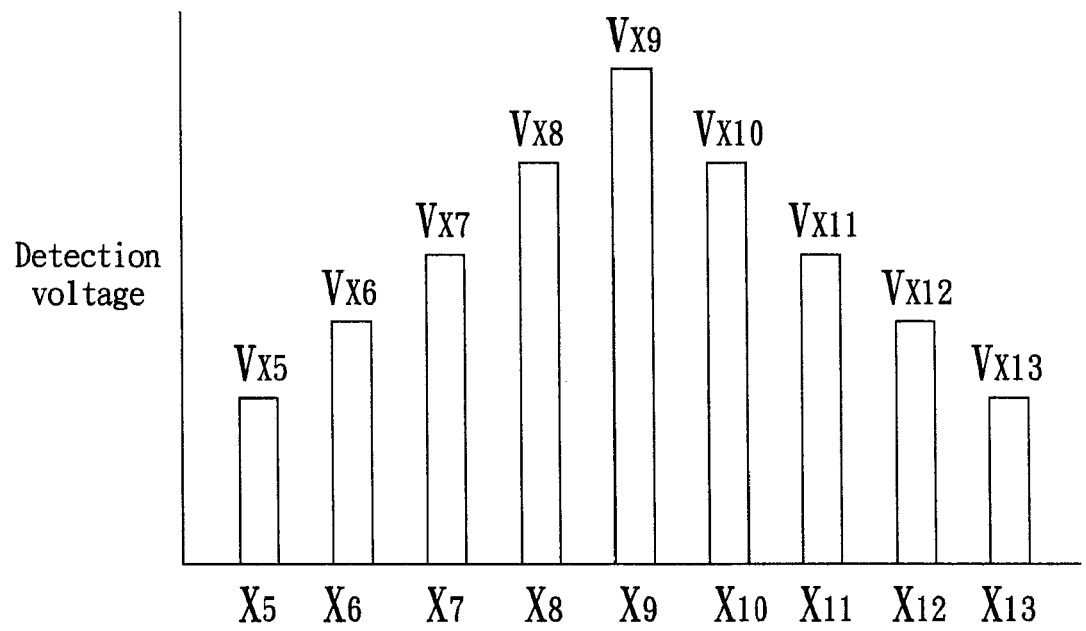

According to the present invention, the second and third voltages are obtained from two antennas arranged at the same side of the antenna that senses the maximum detection voltage. In addition, the two antennas may not be limited to the nearest antennas of the antenna that senses the maximum detection voltage. FIG. 5 illustrates another embodiment according to the present invention, where nine antennas $X_5$-$X_{13}$ sense nine detection voltages $V_{X5}$-$V_{X13}$. The embodiment of FIG. 5 differs from embodiment of FIG. 2 at least in that the pitch between antennas is different. When the stylus approaches the antenna $X_9$, the antenna $X_9$ will sense the maximum detection voltage, that is, the first voltage equals $V_{X9}$. The second voltage may be obtained from antenna $X_{11}$, i.e., $V_{X11}$. The third voltage may be obtained from antenna $X_{13}$, i.e., $V_{X13}$. In another embodiment, similarly, the first voltage equals $V_{X9}$, the second voltage equal $V_{X7}$, and the third voltage equals $V_{X5}$. According to the same equation mentioned above, the X and Y coordinates of the stylus can be computed.

According to the present invention, the coordinate computation circuit 4 is employed for acquiring the first voltage, the second voltage, and the third voltage. A noise-judge value may be stored in the microprocessor 6 for distinguishing whether the detection voltages is noise or not. The noise-judge value may be defined as the maximum voltage detected by the x-y loop antenna array 2 when the handwriting device 8 is free of the stylus 1 thereon. The microprocessor 6 therefore judges that the stylus is approaching if the amplitude of the one or more of the received detection voltages is greater than the amplitude of the noise-judge value. After a sequence of comparison procedure, the first voltage, the second voltage, and the third voltage can be obtained and stored in the plurality of registers.

Figure 6:
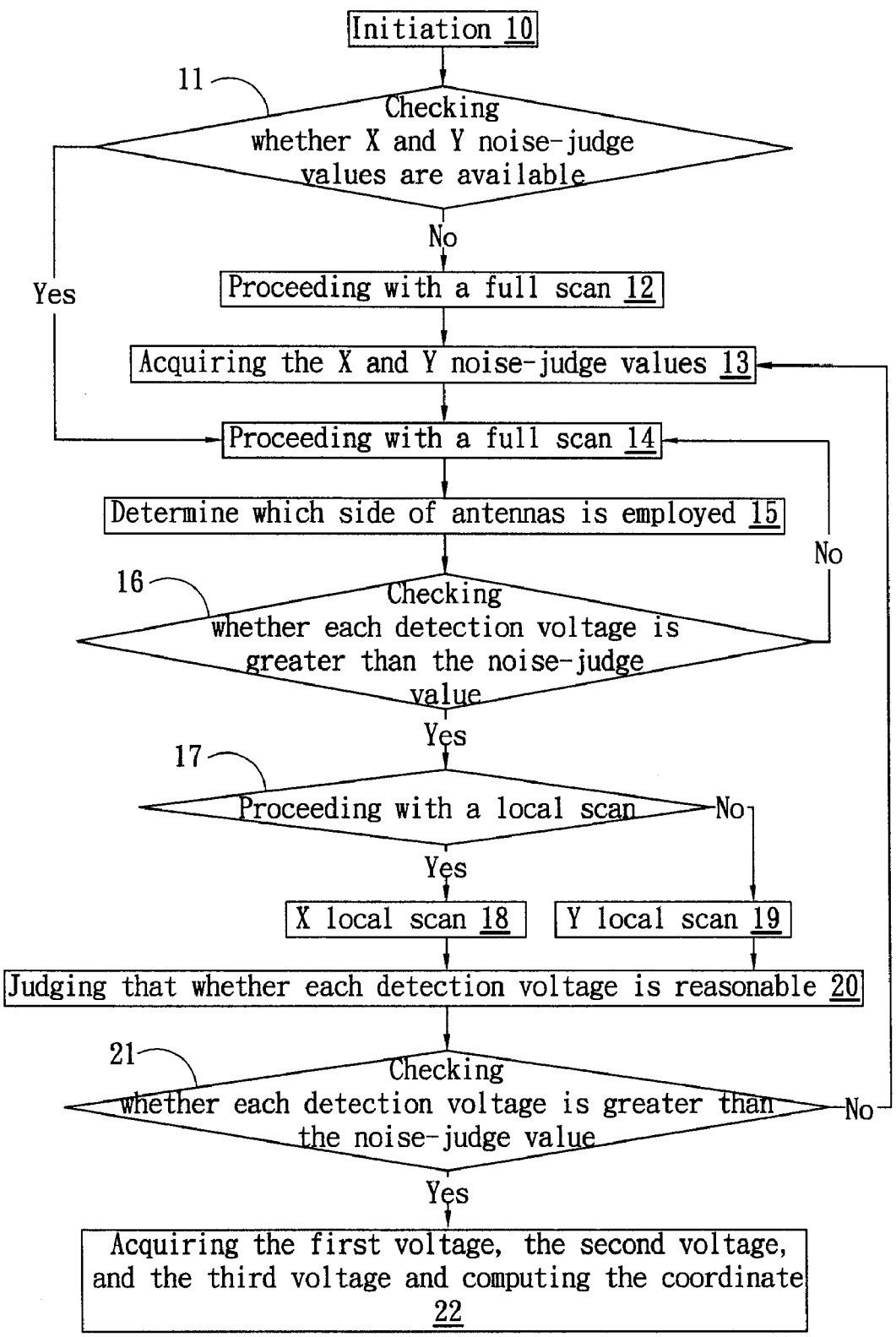

FIG. 6 illustrates a coordinate determining method according to one embodiment of the present invention. Step 10, initiation, the electromagnetic induction handwriting system is started and relative parameters are set. Step 11; check whether X and Y noise-judge values are available. If the noise judge values are not available, proceeds with a full scan in step 12, and acquires the X and Y noise-judge values in step 13. If the X and Y noise-judge values are available, proceeds with a full scan 14 in step 14. The microprocessor instructs each antenna of the x-y loop antenna array to detect electromagnetic wave radiated from the stylus. In step 15, determining which side of antennas is employed for acquiring the second and third voltages. For example, if the position of the stylus is judged at the left edge of the handwriting device, then the antennas of "right side" will be employed. In step 16, checking whether each detection voltage is greater than the noise-judge value (X or Y). Meanwhile, a comparison procedure is performed for acquiring the maximum detection voltage, and then the local area that the stylus is located can be determined. If the maximum detection voltage cannot be obtained in step 16, back to step 14. In step 17, proceeds with a local scan 17. The microprocessor instructs antennas of the x-y loop antenna array within the local area to detect electromagnetic wave radiated from the stylus, for continually acquiring the variation of the coordinate of the stylus. The local scan 17 is divided into an X local scan 18 and a Y local scan 19. In step 20, judging that whether each detection voltage is reasonable 21. Notice that the diction voltages are obtained from the antenna that sense the maximum voltage and antennas from the "same side" of the antenna that sense the maximum voltage. This step can exclude detection voltages radiated from the stylus that is moved too fast. In step 21, checking whether each detection voltage is greater than the noise-judge value (X or Y). This step is continued and a comparison procedure is performed for acquiring the first voltage, the second voltage, and the third voltage. The coordinate of the stylus therefore can be obtained from the equations mentioned before. If none of the detection voltages is greater than the noise-judge value, back to step 13; new X and Y noise-judge values replace the old new X and Y noise-judge values, and then proceeding with the full scan 14.

Although specific embodiments have been illustrated and described, it will be appreciated by those skilled in the art that various modifications may be made without departing from the scope of the present invention, which is intended to be limited solely by the appended claims.

What is claimed is:

1. An electromagnetic induction handwriting system, comprising;
   a stylus;
   a handwriting device;
   an x-y loop antenna array arranged inside of said handwriting device;
   a switch circuit;
   a coordinate computation circuit;
   an analog/digital (A/D) converter;
   a microprocessor; and
   a computer;
   wherein said microprocessor instructs specific antennas of said x-y loop antenna array by switching said switch circuit to detect electromagnetic wave radiated from said stylus, the detection voltages are stored and compared with one another to obtain a first voltage, a second voltage, and a third voltage the coordinate computation circuit employs an arithmetic equation to compute a coordinate of the stylus, the computed coordinate is transmitted to analog/digital (A/D) converter to convert to digital values, and said microprocessor processes the digital coordinate values then transmitting it to said computer; and
   wherein the arithmetic equation is derived from the first voltage, the second voltage, and the third voltage, in which the first voltage equals the maximum detection voltage, the second voltage and the third voltage are obtained from two antennas, and both of the two antennas are arranged at the same side of the antenna that induces the maximum detection voltage.

2. The system as recited in claim 1, wherein said stylus comprises cordless type or battery less type of stylus.

3. The system as recited in claim 1, wherein said stylus comprises an oscillating circuit consisting of LC (inductors and capacitors) and comprises a plurality of push buttons, the push buttons being pressed down then recovered, so as to vary the capacitance of LC and thus vary the frequency of the oscillating circuit.

4. The system as recited in claim 1, wherein said microprocessor proceeds with a full scan and a local scan to determine which side of antennas is employed for acquiring the second and third voltages.

5. The system as recited in claim 1, wherein said x-y loop antenna array is arranged inside said handwriting device in a double-faced, arrayed, and equidistant manner, and the layout of said x-y loop antenna is symmetrical and the pitch between two antenna is designed to meet a simplified equation: $aX^2 + eY + f = 0$ wherein Y denotes the amplitudes of the detection voltages, X denotes the distances between the center of the loop antennas and the x coordinate of the stylus and a, e, and f are constants.

6. The system as recited in claim 1, wherein the second voltage is obtained by an antenna that is the nearest antenna to the antenna that senses the first voltage, and third voltage is obtained by an antenna that is the nearest antenna to the antenna that senses the second voltage.

7. The system as recited in claim 1, wherein the second voltage is obtained by an antenna that has double pitch with the antenna that senses the first voltage, the third voltage is obtained by an antenna that has double pitch with the antenna that senses the second voltage, and the pitch is the distance between antennas.

8. A coordinate determining method for determining a coordinate of a stylus on a handwriting device, comprising the steps of:
providing a x-y loop antenna array;
proceeding with a sequence of comparison procedure to compare the detection voltages of the x-y loop antenna array with a noise-judge value, such that a first voltage, a second voltage, and a third voltage are obtained, wherein the first voltage equals the maximum detection voltage, the second voltage and the third voltage are obtained from two antennas, and both of the two antennas are arranged at the same side of the antenna that induces the maximum detection voltage; and
computing the coordinate of the stylus by an arithmetic equation derived from the first voltage, the second voltage, and the third voltage.

9. The method as recited in claim 8, wherein the x-coordinate of the stylus is computed by the following equation:

$$Xp = X_1 + \Delta x \left[ \frac{4V_{X2} - 3V_{X1} - V_{X3}}{4V_{X2} - 2V_{X1} - 2V_{X3}} \right]$$

wherein $V_{X1}$ denotes the first voltage, $V_{X2}$ denotes the second voltage, $V_{X3}$ denotes third voltage, $\Delta x$ denotes the pitch between two antennas, $X_1$ denotes the x-coordinate of the center of the loop antenna $X_1$, $X_2$ denotes the x-coordinate of the center of the loop antenna $X_2$, and $X_3$ denotes the x-coordinate of the center of the loop antenna $X_3$.

10. The method as recited in claim 9, wherein the y-coordinate of the stylus is computed by the same theory.

* * * * *